US010246353B2

(12) United States Patent
Ritchie et al.

(10) Patent No.: US 10,246,353 B2
(45) Date of Patent: Apr. 2, 2019

(54) APPARATUS FOR ELECTROCOAGULATION TREATMENT OF A LIQUID

(71) Applicant: KOLINA LIMITED, Hertfordshire (GB)

(72) Inventors: Daniel Thomas Exley Ritchie, Harrogate (GB); Roger Nicholas Hensby, Harrogate (GB)

(73) Assignee: KOLINA LIMITED, Hertfordshire (GB)

(*) Notice: Subject to any disclaimer, the term of this patent is extended or adjusted under 35 U.S.C. 154(b) by 312 days.

(21) Appl. No.: 15/039,989

(22) PCT Filed: Nov. 25, 2014

(86) PCT No.: PCT/GB2014/053464
§ 371 (c)(1),
(2) Date: May 27, 2016

(87) PCT Pub. No.: WO2015/079206
PCT Pub. Date: Jun. 4, 2015

(65) Prior Publication Data
US 2017/0022075 A1 Jan. 26, 2017

(30) Foreign Application Priority Data
Nov. 29, 2013 (GB) .................. 1321102.4

(51) Int. Cl.
*C02F 1/461* (2006.01)
*C02F 1/463* (2006.01)
(52) U.S. Cl.
CPC .......... *C02F 1/463* (2013.01); *C02F 1/46104* (2013.01); *C02F 2001/46133* (2013.01); *C02F 2201/006* (2013.01); *C02F 2303/14* (2013.01)

(58) Field of Classification Search
CPC .......................................... C02F 1/463
See application file for complete search history.

(56) References Cited

U.S. PATENT DOCUMENTS 3,623,969 A   11/1971  Hushihara
2002/0148722 A1  10/2002  Hermann et al.
(Continued)

FOREIGN PATENT DOCUMENTS

GB      679879       9/1952
IE   2012-F43502  *  5/2012
(Continued)

OTHER PUBLICATIONS

International Search Report for PCT/GB2014/053464, dated Jan. 30, 2015.
(Continued)

*Primary Examiner* — Salil Jain
(74) *Attorney, Agent, or Firm* — Stephen J. Weyer, Esq.; Stites & Harbison, PLLC

(57) ABSTRACT

Apparatus for Treatment of Liquid A flow-through assembly for electrocoagulation treatment of a liquid has a replaceable cartridge with sacrificial electrodes held in a chamber arranged for flow of the liquid through and over the sacrificial electrodes. The chamber has a pivoting door which can be opened for removal and replacement or refurbishing of the cartridge. One electrode for providing a current to electrochemically dissolve the sacrificial electrodes is located in the chamber with a second electrode on the inner face of the door, with the sacrificial electrodes located between the current-providing electrodes with chamber door closed in use.

12 Claims, 3 Drawing Sheets

(56) References Cited

U.S. PATENT DOCUMENTS

| | | | |
|---|---|---|---|
| 2003/0015418 A1* | 1/2003 | Tseng | C02F 1/46104 |
| | | | 204/252 |
| 2006/0096853 A1* | 5/2006 | King | C02F 1/463 |
| | | | 204/230.2 |
| 2013/0126448 A1 | 5/2013 | McCabe et al. | |
| 2015/0129511 A1* | 5/2015 | Thiyagarajan | A47L 15/4208 |
| | | | 210/787 |

FOREIGN PATENT DOCUMENTS

| | | |
|---|---|---|
| RU | 2436736 | 10/2011 |
| WO | WO-2012059905 | 5/2012 |

OTHER PUBLICATIONS

Written Opinion of the International Searching Authority for PCT/GB2014/053464, dated Jan. 30, 2015.
Intellectual Property Office Search Report for GB1321102.4, dated Oct. 21, 2014.

\* cited by examiner

APPARATUS FOR ELECTROCOAGULATION TREATMENT OF A LIQUID

FIELD

The present invention relates to a flow-through apparatus for electrocoagulation treatment of liquids, in particular for electrocoagulation treatment of aqueous dispersions in order to facilitate removal of particles therefrom by flocculation.

BACKGROUND

The stabilisation and aggregation of colloidal dispersions or emulsions of particles in water or in aqueous solutions, has been explained in terms of DLVO theory (an acronym for the workers Derjaguin, Landau, Verwey and Overbeek who developed the theory) which combines the effects of van der Waals attraction with electrical double layer repulsion between dispersed, charged colloidal particles.

Commonly charged colloidal particles (i.e. colloidal particles having the same sign of charge) are stabilised in colloidal dispersions by mutual electrostatic repulsion forces exceeding the attractive van der Waals attraction. Particles in a colloidal state may typically have a particle diameter from about 1 to 10,000 nm.

The charged particles may attract counterions, of opposite charge to their charged surfaces, from their aqueous surroundings, resulting in the formation of an electrical double layer (EDL) at the particle surface. This EDL screens the electrical repulsion between particles, and so by formation of a suitable EDL, the electrostatic repulsion between the commonly charged colloidal particles may be sufficiently screened in order to allow van der Waals forces to drive coalescence of the particles into larger, bulk agglomerates or flocs.

Typically, for water purification, or for extraction of desired materials from an aqueous dispersion or slurry, in order to remove colloidal particles from water by flocculation, modification of the EDL may be achieved by addition of electrolyte to the colloidal dispersion to be flocculated. However, for water purification, this has the disadvantage that high levels of dissolved electrolyte may remain in the water remaining after flocculated material has been removed.

Electrocoagulation is based upon the use of electrochemical dissolution of an electrode by electrolytic oxidation with $OH^-$ to form counterions of high charge, at the anodes, which can aid flocculation (typically cations such as $Fe^{3+}$ or $Al^{3+}$ for flocculation of fatty particles) without the need for addition of corresponding salt-derived anions into the liquid to be treated (typically $OH^-$ will be the counterions formed in the electrocoagulation process). In parallel with the formation of the cations formed at the anode, gas bubbles (hydrogen) are also formed at the cathode.

For a typical electrocoagulation system, opposed electrodes may be used to provide a voltage difference across one or more sacrificial electrodes positioned between the opposed electrodes, with the sacrificial electrodes not electrically connected to each other or to the opposed electrodes other than through the liquid. This results in an electrical field being set up across the sacrificial electrodes, causing them to have cathodic and anodic surfaces and causing a current to flow between them and the opposed electrodes, typically with the material of the sacrificial electrodes oxidising and dissolving at the anodic surfaces and hydrogen bubbles being generated at the cathodic surfaces. For instance with sacrificial electrodes of aluminium, aluminium hydroxide is formed at the cathode and can lead to flocculation or co-precipitation of colloidal particles within the liquid to be treated.

For removal of dispersed particulate matter from water, the presence of gas bubbles from the cathode, subsequently entrained within the resulting floc of particulate matter, may assist in removal of the particulate matter by flotation and bulk separation, as the particulate matter, particularly if fatty matter, is typically of lower density than water, and the additional presence of entrained gas bubbles may further reduce the density of the floc formed, assisting in speeding separation by flotation of the floc to form a separate layer for subsequent removal to leave purified water.

A problem with electrocoagulation systems is the need to replace the electrodes at intervals as the electrodes dissolve or become coated with impervious oxide layers during use. Whilst electrodes are being replaced, the liquid to be treated, such as waste water to be purified, may continue to accumulate and so there is a need to provide electrocoagulation apparatus and methods which allow for easy and rapid replacement of electrodes in use.

SUMMARY

It is one aim of the present invention, amongst others, to provide electrocoagulation apparatus and methods which allow for easy and rapid replacement of electrodes in use. It is also an aim of the invention to provide electrocoagulation apparatus and methods which address problems known from prior art electrocoagulation systems or which address other problems, such as those mentioned herinafter or otherwise present for electrocoagulation systems. For instance, one aim of the invention is to provide an electrocoagulation system suitable for treatment of waste water streams for which accumulation of waste water cannot be halted whilst maintenance is carried out on the electrocoagulation apparatus, making rapid maintenance highly desirable. In particular, it is an aim of the invention to provide electrocoagulation apparatus and methods suitable for purification of water by flotation separation of fatty matter from a waste water stream, such as a waste stream from an industrial processing site such as a food manufacturing plant, abattoir, polymer recycling plant or the like. Another aim of the invention is to provide electrocoagulation apparatus suitable for use in separating particulate matter from an aqueous slurry or dispersion as part of a process for winning and extracting desired materials, such as heavy metals. It is also an aim of the invention to provide an electrocoagulation apparatus which may be used continuously to treat effluent streams of varying concentrations and which reduce or eliminate risk of polluting waste entering the public sewage system or environment. It is also an aim of the invention to provide an alternative to prior art apparatuses and methods.

According to the present invention there is provided an apparatus and method as set forth in the appended claims. Other features of the invention will be apparent from the dependent claims, and the description which follows.

Throughout this specification, the term "comprising" or "comprises" means including the component(s) specified but not to the exclusion of the presence of other components. The term "consisting essentially of" or "consists essentially of" means including the components specified but excluding other components except for components added for a purpose other than achieving the technical effect of the invention. The term "consisting of" or "consists of" means including the components specified but excluding other components.

Whenever appropriate, depending upon the context, the use of the term "comprises" or "comprising" may also be taken to include the meaning "consists essentially of" or "consisting essentially of", and also may also be taken to include the meaning "consists of" or "consisting of".

The optional features set out herein may be used either individually or in combination with each other where appropriate, and particularly in the combinations as set out in the accompanying claims. The optional features for each aspect or exemplary embodiment of the invention, as set out herein, are also applicable to any other aspects or exemplary embodiments of the invention where appropriate. In other words, the skilled person reading this specification should consider the optional features for each aspect or embodiment of the invention as interchangeable and combinable between different aspects or exemplary embodiments of the invention.

A first aspect of the invention provides a flow-through assembly for electrocoagulation treatment of a liquid, the assembly comprising:
 a) a cartridge comprising sacrificial electrodes,
 b) a chamber comprising:
  an enclosure arranged for removable retention of the cartridge comprising sacrificial electrodes,
  an opening through which the cartridge is removable from the enclosure,
  an inlet port and an outlet port arranged for flow of said liquid through the chamber, into the inlet port, over the sacrificial electrodes, and out of the outlet port,
 c) a chamber door pivotably movable relative to the chamber through a hinge arrangement about which the door is pivotable between an open configuration and a closed configuration of the chamber door, wherein
  in the closed configuration, an inner face of the chamber door is adapted to form a liquid tight seal at the opening, and
  wherein in the open configuration, the cartridge is removable from the enclosure through the opening, and
 d) a retaining means arranged to releasably hold the chamber door in the closed configuration,
 wherein the chamber door comprises a first electrode on its inner face and the chamber comprises a second electrode positioned relative to the first electrode such that the sacrificial electrodes of the cartridge are located between the first and second electrodes with the chamber door in the closed configuration.

The term liquid as used herein refers to any liquid suitable for application of electrocoagulation treatment, and includes flowable dispersions or slurries of particulate solids or liquids present in a continuous phase of solvent or solution. Typically the solvent or solution may be aqueous solvent or solution, for instance with the solvent or solution having 50% or more by weight of water therein. The term particle merely means "small portion" and particles may be of liquid or solid, so for instance the oil droplets in an oil-in-water emulsion used as liquid are referred to herein as oil particles dispersed in a continuous aqueous phase.

The term electrocoagulation as used herein also encompasses the meaning electroprecipitation.

The chamber may have a body having front and rear faces and an aperture therein. There may be a rear wall closing the rear face the body with the enclosure formed by the aperture and an inner face of the rear wall. The inlet and outlet may ports pass through lower and upper portions of the body respectively in use. The opening through which the cartridge is removable and replaceable when the chamber door is in the open configuration may be formed by the aperture at the front face of the body.

The chamber and the chamber door may each be formed of an electrically insulating material, such as a rigid polymeric material. Suitably, with the chamber may be formed as a unitary structure with the body and the rear wall as a unitary structure. For instance the chamber may be formed by a suitable moulding process, or by forming the aperture in the chamber by removal of material, such as by milling, with the inlet and outlet ports formed by drilling holes through the body, into the aperture, through upper and lower portions of the body.

In order to facilitate the formation of a liquid-tight seal between the chamber and the chamber door, either or both of the chamber in chamber door may be provided with a groove surrounding the opening and adapted to accept a gasket, for instance a gasket of the an elastomeric material such as Viton™.

The flow-through assembly of the first aspect of the invention may comprise a casing configured to retain and enclose the chamber and the chamber door therein.

Suitably, the casing may comprises a casing body configured to retain the chamber therein and a casing door, wherein the casing door is hinged to the casing body to be pivotable between an open position and a closed position of the casing door, and wherein in the closed position, the casing door may be arranged to hold the chamber door in the closed configuration of the chamber door.

The retaining means, for releasably holding the chamber door in the closed configuration, for instance when the assembly of the invention is in use for electrocoagulation treatment of a liquid flowing therethrough, may comprises one or more swing bolts pivotally mounted to the casing body and arranged to engage with slots in the casing door in order to hold the casing door in its closed position by means of nuts tightened onto the one or more swing bolts and against the casing door.

Suitably, the casing body and casing door may be of a conductive metal, such as a metal alloy or steel, and may comprise an electrical earthing connector.

The flow-through assembly of the invention may be configured for use with the inlet port positioned below the outlet port with the chamber and casing doors door configured to each pivot about a substantially vertical respective pivot axis. This provides the benefit that gas bubbles which may be generated during the electrochemical dissolution of the sacrificial electrodes will be swept along with the flow of liquid rather than moving in a direction counter to the flow, and this may be beneficial to avoid the accumulation of gas bubbles within the enclosure of the chamber.

The flow-through assembly may comprise an electrical junction box located on an outer face of the chamber door, arranged for connection of an electrical power supply to deliver current to a central portion of the first electrode. The configuration of the flow-through the assembly of the invention, with the first electrode positioned in the door of the chamber, allows for easy connection of political power supply to a central portion of the first electrode and this permits an even distribution of current flow over the entire surface of the electrode compared to arrangements where current may be delivered to a corner or edge of electrode.

In one suitable arrangement of the cartridge, the cartridge may comprise a pair of opposed jambs or pillars of electrically insulating material having one or more sheets forming the sacrificial electrodes, each having opposed edges retained in a respective slot in each opposed jamb. The sheets may typically be rectangular in shape. The sacrificial electrodes may be of any suitable material for electrochemical dissolution, depending upon the nature of the liquid to be treated. Typically, the sacrificial electrodes may be of metal, and may comprise or consist essentially of aluminium or iron (e.g. steel). Aluminium-based electrodes may be particularly useful for the treatment of waste water in order to provide coagulation and coalescence of fatty materials dispersed therein whereby purification by bulk separation of fatty material and purified water may be facilitated. The first and second electrodes may suitably be of a material having a higher resistance to electrochemical dissolution then the sacrificial electrodes. For instance, if the sacrificial electrodes are of aluminium, the first and second electrodes may be of steel. If the sacrificial electrodes are of one grade of steel, the first and second electrodes may each be of a different grade of steel, more resistant to electrolytic dissolution than the steel of the sacrificial electrodes.

The flow-through assembly of the invention may comprise a relay configured to switch off an electrical power supply to the first and second electrodes when the door is pivoted from the closed configuration or when the retaining means is released to allow the chamber door to pivot from the closed configuration.

A second aspect of the invention provides a method of replacing sacrificial electrodes in a flow-through assembly for electrocoagulation treatment of a liquid, according to any preceding claim, the method comprising:
  releasing the retaining means and pivoting the chamber door to the open configuration,
  removing a depleted cartridge comprising sacrificial electrodes from the enclosure through the opening,
  inserting a replacement or refurbished cartridge into the enclosure through the opening,
  pivoting the chamber door to the closed configuration and fastening the retaining means to hold the chamber door in the closed configuration.

By a refurbished cartridge it is meant that the cartridge may be removed and the spent sacrificial electrodes may be replaced to refurbish the spent cartridge and to provide a refurbished cartridge which may then be replaced into the enclosure of the chamber for further use of the flow-through assembly of the invention for electrocoagulation.

The preferred and optional features set out in relation to the first aspect of the invention are also applicable to the second aspect of the invention.

A third aspect of the invention provides a method of treating a liquid by electrocoagulation, the method comprising flowing the liquid into the inlet port and out of the outlet port of a flow-through assembly according to any preceding claim whilst passing a current between the first and second electrodes whereby the sacrificial electrodes are electrochemically dissolved into the liquid. Once again, the preferred and optional features as set out in relation to the first aspect of the invention are applicable to this third aspect of the invention. The third aspect of the invention is particularly useful when the liquid is waste water, contaminated with a fatty material dispersed therein, so that the electrocoagulation process carried out in the apparatus of the invention may be used to facilitate coagulation and coalescence of the dispersed fatty materials in order to force facilitate subsequent bulk separation of the fatty materials from consequently purified water.

DETAILED DESCRIPTION

For a better understanding of the invention, and to show how exemplary embodiments of the same may be carried into effect, reference will be made, by way of example only, to the accompanying diagrammatic Figures, in which:

FIG. 1 schematically depicts a perspective view of an embodiment of a flow-through assembly according to the first aspect of the invention;

FIG. 2 schematically depicts a perspective view of the chamber and chamber door of the embodiment of FIG. 1, with the casing removed for the sake of clarity;

Figure 1:
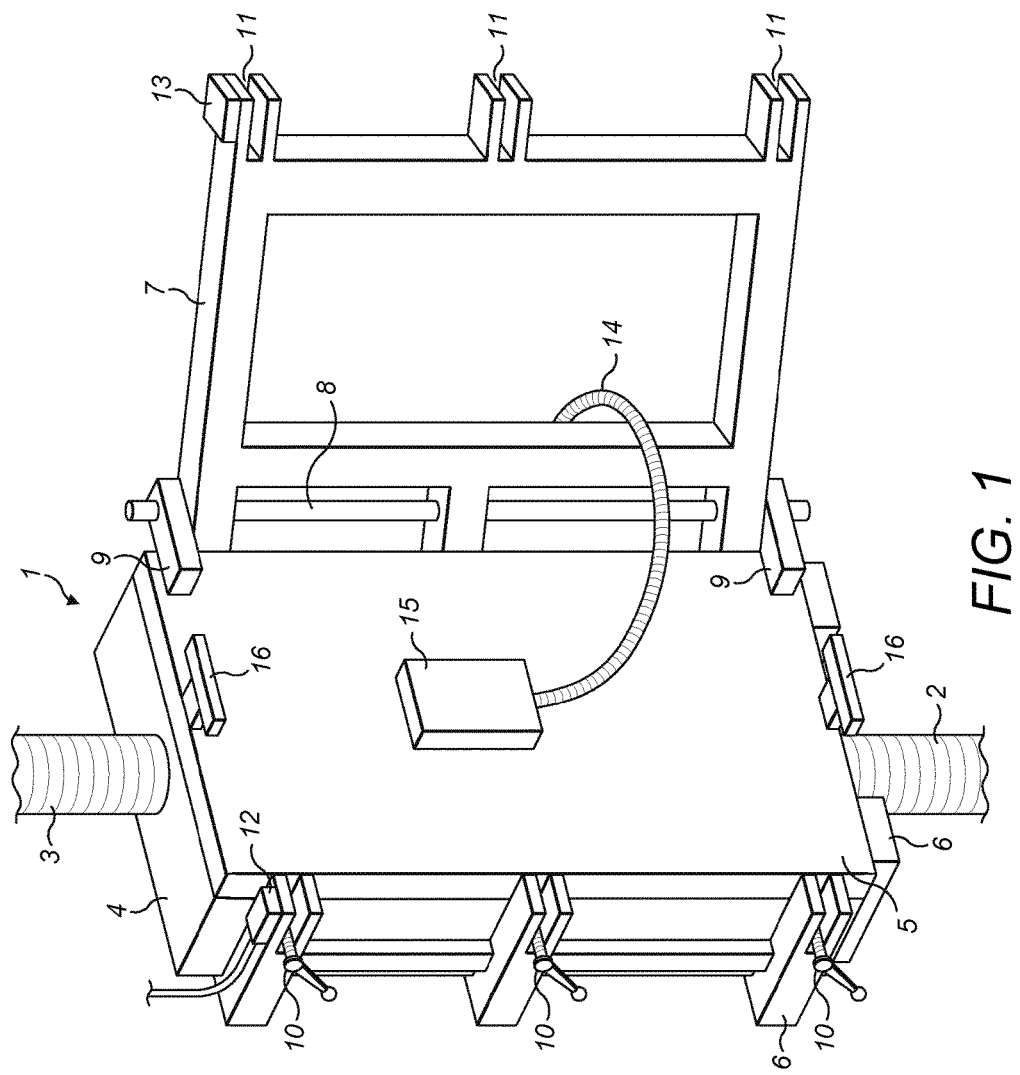

Common reference numerals have been used throughout the Figures, and in the description as set out below, reference is made to the same embodiment of the invention with the various features of the embodiment illustrated in the Figures.

Figure 2:
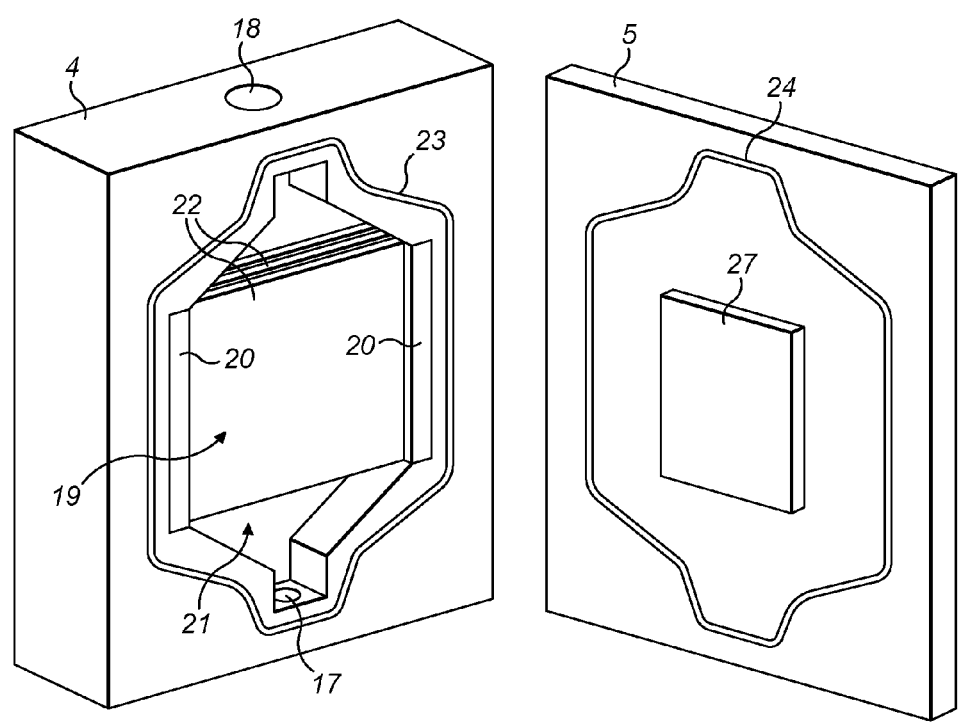
Figure 3:
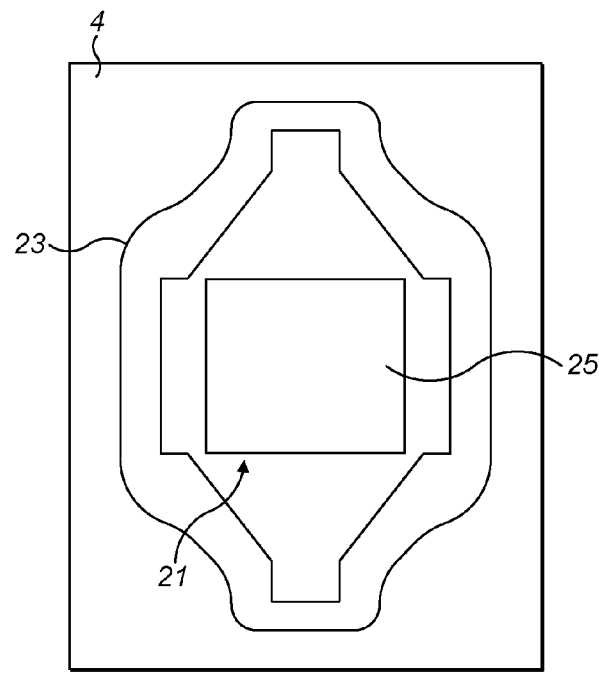
FIG. 3 shows a schematic plan view of the chamber of the embodiment of FIGS. 1 and 2 with the cartridge removed.

The flow-through assembly according to the first aspect of the invention has a chamber 4 and a chamber door 5 shown with the chamber door 5 in the closed configuration in FIG. 1. In FIG. 2, the chamber 4 is shown, with the casing body and door 6, 7 removed for the sake of clarity, and with the chamber door 5 in the open configuration.

Returning to FIG. 1, the casing includes a casing body 6 and a casing door 7 which is shown with the casing door in the open position in FIG. 1. An inlet conduit to 2 is arranged to provide flow of liquid into the inlet port 17 of the chamber 4 and an outlet conduit 3 is arranged to provide flow of liquid out of the outlet port 18 of the chamber 4.

The chamber door 5 is hinged to the casing door 7 for pivotal rotation between the open and close configurations of the chamber door 5. Handles 16 are provided on the chamber door 5 to facilitate pivoting of the chamber door 5 between the open and closed positions. The casing door 7 is pivotally hinged to the casing body 6 by a hinge arrangement which is not shown.

Swing bolts with nuts 10 are pivotally mounted on the casing body 6 and are arranged to pass through slots 11 in the casing door 7 when the casing door 7 is in the closed position. The nuts, shown as nuts provided with levers, are used to hold and lock the casing door 7 in the closed position by tightening of the nuts along the swing Bolts 10 against the casing door 7.

The chamber 4 includes an enclosure 21 forming the opening in the front face of the chamber 4. The opening is surrounded by a groove in the chamber 4 holding a gasket 23 and a corresponding groove 24 is provided in the chamber door 5 in order to facilitate a liquid-tight seal between the front face of the chamber 4 and inner face of the chamber door 5 when the chamber door 5 is in the closed position.

Figure 4:
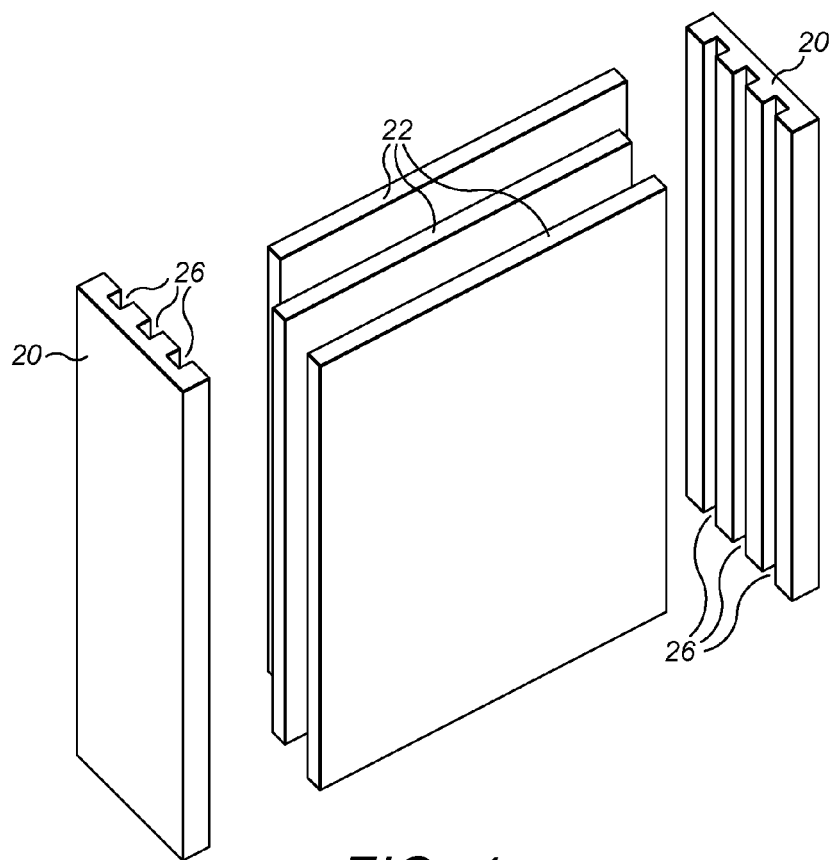
FIG. 4 shows an exploded perspective view of the cartridge of the embodiment of FIGS. 1 to 3.

In FIG. 2, the replaceable cartridge 19 is shown located within the enclosure 21 and further detail of the cartridge is given in the exploded diagram shown in FIG. 4. The cartridge is shaped to slot into the enclosure 21 and includes sacrificial electrodes 22 in the form of rectangular plates held between the opposed jambs 20 in slots 26 formed in the opposed faces of the jambs.

A junction box 15 is positioned on an outer face of the chamber door 5 and provides a connection means between a power supply cable 14 and the first electrode 27 located on an inner face of the chamber door 5. In addition to the first electrode 27 on the inner face of the chamber door 5, there is a second electrode 25 positioned on an inner face of the rear wall of the chamber 4.

It is evident from the Figures that when the chamber door 5 is in the closed configuration, the sacrificial electrodes 22 are positioned within the enclosure 21 to be aligned between the first electrode 27 and second electrode 25.

For this embodiment, the first and second electrodes 27, 25 are of steel while the sacrificial electrodes 22 are of aluminium. With such an arrangement, the steel electrodes may endure through many replacement, or refurbished, sets of aluminium sacrificial electrodes.

A second electrical cable (not shown) provides an electrical connection to supply power to the second electrode 25.

A relay 12 in the form of an encased magnetic reed switch is provided on the casing body 6 and a magnet 13 provided on the casing door 7 is positioned to cause the reed switch of the relay 12 to cut off power to the electrodes 27, 25 of the electrocoagulation apparatus when the casing door 7 is moved from the closed position towards the open position.

In use, liquid to be treated, such as waste water containing oil or fat particles dispersed therein, particularly colloidal oil or fat particles in the form of an emulsion or Pickering emulsion is caused to flow through the enclosure 21 of the chamber 4 with the door of the chamber 5 in the closed configuration and with the casing door retained in the closed position by the swing bolts and nuts 10 engaged into the slots 11. The liquid to be treated, for instance waste water, enters through the inlet port 17 and exits the enclosure 21 through the outlet port 18 passing through and over the surfaces of the sacrificial electrodes 22.

A voltage is applied, by a power supply, across the first and second electrodes 27, 25 and the resulting electric field causes the sacrificial electrodes to have cathodic and anodic surfaces, with the material of the sacrificial electrodes oxidising and dissolving at the anodic surfaces and hydrogen bubbles being generated at the cathodic surfaces. Typically, a voltage of 200 to 600V may be applied, with a direct current in the range from 15 to 20 A passing between the first and second electrodes 27, 25. In order to prevent excessive build-up of oxide on the sacrificial electrodes, the direct current may be reversed at intervals in order to switch the cathodic surfaces to become anodic surfaces and vice versa.

In a waste-water treatment system for purification of waste-water including colloidal fatty particles and including the flow-through apparatus of the invention, the waste-water, after passing though the apparatus and being subjected to electrocoagulation treatment, may be transferred to a separation chamber, in which the particles of fatty material, now less mutually repulsive as a result of the presence of highly charged cations, may flocculate together to form a floating mass over the remaining purified water in the separation chamber, with the flocculated mass also including entrapped gas generated in the electrocoagulation process. The purified water may be flowed out of the separation chamber for storage, further treatment or disposal, with the floating mass removed be a suitable means such as surface scraping or overflow to a fat collection chamber.

When it becomes necessary to replace the sacrificial electrodes (which necessity may be monitored, for instance, by monitoring of the voltage and current characteristics measured between the first and second electrodes 27, 25 during electrocoagulation) then the flow may be stopped and the swing bolts and nuts 10 released from the slots 11 to allow the casing door 7 to be pivoted from the closed position to the open position. If the power supply to the first and second electrodes 27, 25 has not been switched off prior to opening the casing door 7, the movement of the magnet 13 away from the reed switch 12 will cause the power to be cut off in order to avoid hazard of inadvertent electrocution for the operator. The chamber door 5 may then be opened with the assistance of the handles 16 in order to provide access to the enclosure 21 and cartridge 19 by pivoting the chamber door for about the hinges 9 to the open configuration.

The cartridge 19 may be pulled out of the enclosure 21 and replaced or refurbished and replaced, followed by pivoting the chamber door 5 back into its closed configuration and retaining the casing door 7 back in its closed position prior to re-commencing the flow of the liquid through the flow-through apparatus and switching on the electrical power supply to the first and second electrodes 27, 25.

In summary, the invention provides a flow-through assembly for electrocoagulation treatment of a liquid has a replaceable cartridge with sacrificial electrodes held in a chamber arranged for flow of the liquid through and over the sacrificial electrodes. The chamber has a pivoting door which can be opened for removal and replacement or refurbishing of the cartridge. One electrode for providing a current to electrochemically dissolve the sacrificial electrodes is located in the chamber with a second electrode on the inner face of the door, with the sacrificial electrodes located between the current-providing electrodes with chamber door closed in use.

Although a few exemplary embodiments have been shown and described, it will be appreciated by those skilled in the art that various changes and modifications may be made without departing from the scope of the invention, as defined in the appended claims. For example, although the casing is shown as a skeletal structure in the embodiment of the Figures, the casing may completely enclose the chamber.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, and drawings), and/or all of the steps of any method or process so disclosed, may be combined in any combination, except combinations where at least some of such features and/or steps are mutually exclusive.

Each feature disclosed in this specification (including any accompanying claims, and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, and drawings), or to any novel one, or any novel combination, of the steps of any method or process so disclosed.

The invention claimed is:

1. A flow-through assembly for electrocoagulation treatment of a liquid, the assembly comprising:
   a) a cartridge comprising sacrificial electrodes,
   b) a chamber comprising:
      an enclosure arranged for removable retention of the cartridge comprising sacrificial electrodes,
      an opening through which the cartridge is removable from the enclosure, an inlet port and an outlet port in the chamber arranged for flow of said liquid, into the inlet port, over the sacrificial electrodes in the enclosure, and out of the outlet port, c) a chamber door pivotably movable relative to the chamber through a hinge arrangement about which the door is pivotable between an open configuration and a closed configuration of the chamber door, wherein in the closed configuration, an inner face of the chamber door is adapted to form a liquid tight seal at the opening, and in the open configuration, the cartridge is removable from the enclosure through the opening, wherein the chamber door comprises a first electrode on its inner face and the chamber comprises a second electrode positioned relative to the first electrode such that the sacrificial electrodes of the cartridge are located between the first and second electrodes with the chamber door in the closed configuration;

wherein the assembly further comprises a casing body and a casing door, the casing body and the casing door configured to retain and surround the chamber and the chamber door therein;

wherein the casing door is hinged to the casing body to be pivotable between an open position and a closed position of the casing door, and wherein in the closed position, the casing door is arranged to hold the chamber door in the closed configuration of the chamber door; and wherein the casing body comprises a mechanical fastener arrangeable to releasably hold the casing door in the closed position.

2. The flow-through assembly according to claim 1 wherein the chamber and chamber door are each formed of an electrically insulating material.

3. The flow-through assembly according to claim 1 wherein the mechanical fastener comprises one or more swing bolts pivotally mounted to the casing body and arranged to engage with slots in the casing door to hold the casing door in the closed position by means of nuts tightened onto the one or more swing bolts and against the casing door.

4. The flow-through assembly according to claim 1 wherein the casing body and casing door are of a conductive metal and comprise an electrical earthing connector.

5. The flow-through assembly according to claim 1 wherein the assembly is configured for use with the inlet port positioned below the outlet port.

6. The flow-through assembly according to claim 1 wherein the assembly comprises an electrical junction box located on an outer face of the chamber door arranged for connection of an electrical power supply to deliver current to a central portion of the first electrode.

7. The flow-through assembly according to claim 1 wherein the cartridge comprises a pair of opposed jambs of electrically insulating material having one or more sacrificial electrode sheets each having opposed edges retained in a respective slot in each opposed jamb.

8. The flow-through assembly according to claim 1 wherein the sacrificial electrodes comprise aluminum or iron.

9. The flow-through assembly according to claim 1 wherein the assembly comprises a relay configured to switch off an electrical power supply to the first and second electrodes when the mechanical fastener is arranged to release the door from the closed configuration.

10. The flow-through assembly of claim 1 wherein the assembly comprises a relay configured to switch off an electrical power supply to the first and second electrodes when the casing door is pivoted from the closed configuration.

11. A method of replacing sacrificial electrodes in a flow-through assembly for electrocoagulation treatment of a liquid, according to claim 1, the method comprising:

releasing the mechanical fastener and pivoting the casing door to the open configuration, removing a depleted cartridge comprising sacrificial electrodes from the enclosure through the opening, inserting a replacement or refurbished cartridge into the enclosure through the opening, pivoting the casing door to the closed position and fastening the mechanical fastener to hold casing door in the closed position and the chamber door in the closed configuration, and wherein the assembly further comprises a casing body and a casing door, the casing body and the casing door configured to retain and surround the chamber and the chamber door therein;

wherein the casing door is hinged to the casing body to be pivotable between an open position and a closed position of the casing door, and wherein in the closed position, the casing door is arranged to hold the chamber door in the closed configuration of the chamber door; and wherein the casing body comprises a mechanical fastener arrangeable to releasably hold the casing door in the closed position.

12. A method of treating a liquid by electrocoagulation, the method comprising flowing the liquid into the inlet port and out of the outlet port of a flow-through assembly according to claim 1 whilst passing a current between the first and second electrodes whereby the sacrificial electrodes are electrochemically dissolved into the liquid.

* * * * *